J. GODDARD.
WINDING KEY FOR ROLL HOLDING CAMERAS.
APPLICATION FILED JUNE 25, 1914.

1,133,128.

Patented Mar. 23, 1915.

Witnesses

Inventor
Joseph Goddard
by
Attorney

UNITED STATES PATENT OFFICE.

JOSEPH GODDARD, OF ROCHESTER, NEW YORK, ASSIGNOR TO SENECA CAMERA MANUFACTURING COMPANY, OF NEW YORK, N. Y., A CORPORATION OF NEW YORK.

WINDING-KEY FOR ROLL-HOLDING CAMERAS.

1,133,128.   Specification of Letters Patent.   Patented Mar. 23, 1915.

Application filed June 25, 1914. Serial No. 847,285.

*To all whom it may concern:*

Be it known that I, JOSEPH GODDARD, a citizen of the United States, residing at Rochester, in the county of Monroe and State of New York, have invented new and useful Improvements in Winding-Keys for Roll-Holding Cameras, of which the following is a specification.

The present invention relates to improvements in photographic cameras and more particularly to those of the type having spools to feed a flexible sensitized film past the lens, a winding key being provided for one of the spools to advance the film.

The primary object of this invention is to provide an improved winding key for cameras of this type which is simple and relatively inexpensive in construction, capable of being easily assembled, and which in use operates efficiently to wind the film in a forward direction and to prevent retrograde motion thereof, the key being easily retraced when it becomes necessary to replace a spool.

To these and other ends, the invention consists in certain improvements, and combinations and arrangements of parts, all as will be hereinafter more fully described, the novel features being pointed out particularly in the claims at the end of the specification.

Figure 1:
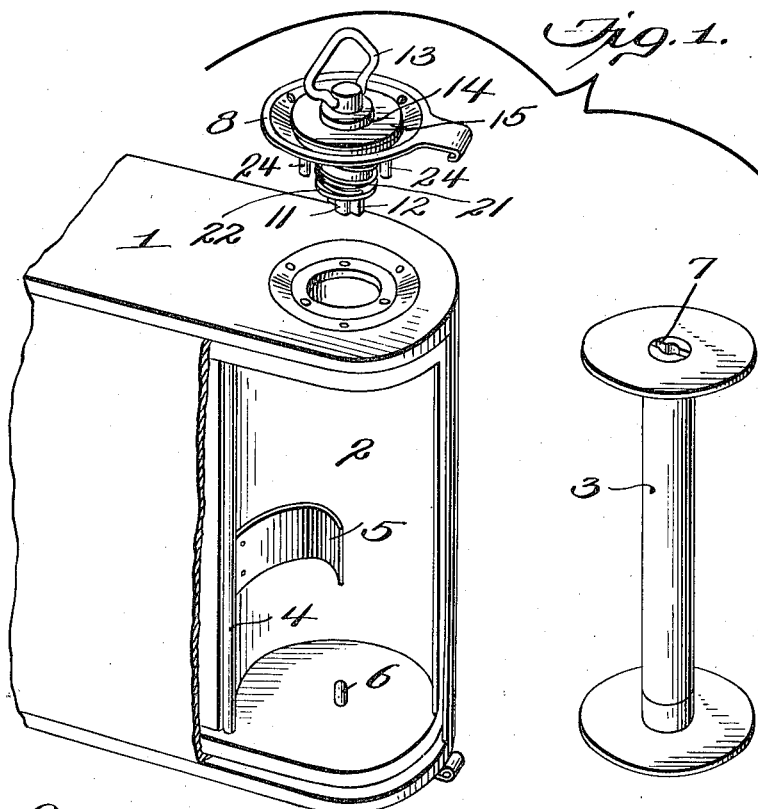
Figure 2:
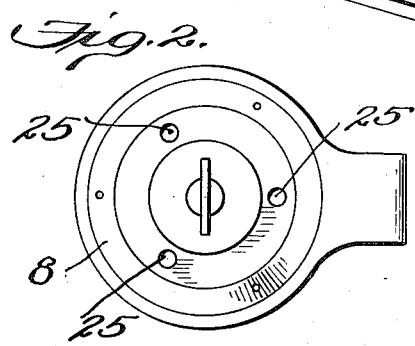
Figure 3:
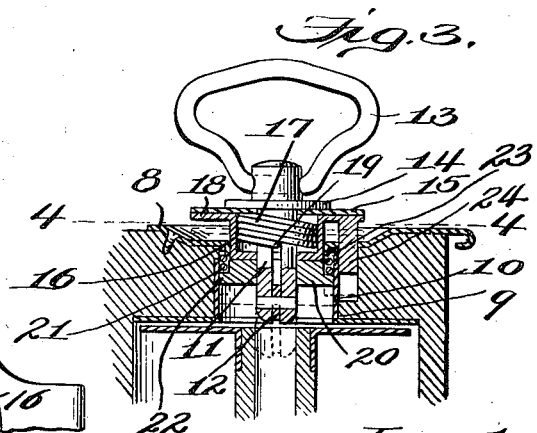
Figure 4:
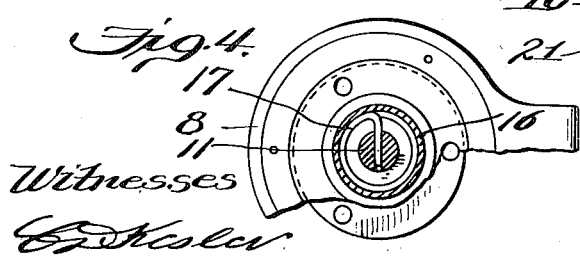

In the accompanying drawing:— Figure 1 is a perspective view of one end of a film or roll-holding camera showing the spool removed therefrom and the winding key in detached position; Fig. 2 is an exterior or top plan view of the winding key; Fig. 3 represents a central axial section through the winding key and through the adjacent portion of the camera and the spool; and Fig. 4 represents a section on the line 4—4 of Fig. 3.

Similar parts are designated by the same reference characters in the several views.

Winding keys embodying the present invention are applicable generally to roll-holding or film cameras of the type adapted to use a flexible film and having a spool to wind the film thereon.

In the present instance 1 designates one end of a camera of that type having a compartment 2 to accommodate a winding spool 3, 4 designating a roller over which the film passes to the spool from the exposing field of the lens, and 5 designating a tension spring to insure proper winding of the film upon the spool. One end of the spool is adapted to turn upon a relatively fixed pivot 6 arranged in the bottom of the spool compartment, and the winding key forming the subject-matter of the present invention is adapted to coöperate with the opposite end of the spool, the latter having a slot or keyway 7 to detachably coöperate with the winding key.

The winding key embodying the present invention comprises a plate 8 which is secured by screws, as shown, or equivalent means to the exterior of the camera casing and in line with the axis of the spool compartment. The adjacent wall of the casing has an aperture 9 extending therethrough, and this aperture is preferably lined with a cylindrical metal bushing 10. A spindle 11 is provided, this spindle having a cross-piece 12 secured thereto, the inner end of the spindle being adapted to enter an aperture in the slotted end of the spool, and the cross-piece 12 is adapted to enter the slot 7 in the spool and thereby form a driving connection between the spool and the key. The spindle is provided exteriorly of the camera casing with a handle 13 by which it may be rotated. The spindle also has exteriorly of the casing a collar or shoulder 14, a plate or disk 15 loosely surrounds the spindle immediately beneath the collar or shoulder 14, and a drum 16 is loosely fitted over the spindle, it having a cylindrical portion containing a clutch spring 17 and a flange 18 which lies against the under side of the disk or plate 15. The spring 17 has one end 19 fixed to the spindle while its opposite end is free, the spring being coiled in form, and the spindle can be rotated in one direction without interference by the spring although motion tending to rotate the spindle in a reverse direction will cause expansion or unwinding of the spring within the cylidrical portion of the drum, the spring then acting as a uni-directional clutch to prevent reverse rotation of the spindle. A head 20 is fitted over the inner end of the spindle and is retained thereon by the cross-piece 12. A coiled compression spring 21 is interposed between a shoulder 22 on the head 20 and the inner side of the plate 8, this spring acting to draw the key inwardly and to maintain it in operative relation with the spool although retraction of the key can be effected by overcoming the force of the spring 21. The shoulder 22 on the head 20 fits within the lining or bushing 10 in the camera casing while the plate 8 has a flange or hub 23 which coöperates with the cylindrical exterior of the drum 16 whereby the key is maintained in axial alinement with the spool. The key is shown in retracted position by the full lines in Fig. 3 and in normal or operative relation to the spool by the dotted lines in said figure. In order to prevent rotation of the drum 16 should it be attempted to wind the key in a reverse direction, the flange 18 of said drum is formed with a suitable number of pins 24, three pins being shown in the present instance, and these pins operate through apertures 25 in the plate 8, the camera casing being recessed or bored out to receive these pins. These pins serve not only to prevent rotation of the drum 16 but they also assist in guiding the key when the latter is being retracted or returned to normal position and maintaining the key spindle in axial alinement with the axis of the spool.

I claim as my invention:—

1. In a camera, the combination with the camera body, of a spool winding key, a uni-directional clutch member co-axial with the winding key and connected with the camera body so as to be axially movable but non-rotatable with respect thereto, a second clutch member attached to the key, and adapted to engage the first-mentioned clutch member, and connections between the key and the first clutch member by which they are held to move axially together.

2. In a camera, the combination with the camera body, of a spool winding key, a uni-directional clutch member co-axial with the winding key and connected with the camera body so as to be axially movable but non-rotatable with respect thereto, a second clutch member attached to the key, and adapted to engage the first-mentioned clutch member, connections between the key and the first clutch member by which they are held to move axially together, and a spring tending to move the first clutch member inwardly with respect to the camera body.

3. In a camera, the combination of a winding key to coöperate with a film-winding spool, a clutch coöperative with the key to prevent retrograde movement thereof, a member adapted to be attached to the camera body, and means embodying pins arranged eccentrically of the axis of the key and movable longitudinally relatively to said member for holding said clutch against rotation and permitting axial movement of the clutch relatively to said member.

4. In a camera, the combination of a winding key embodying a spindle adapted to coöperate with a film-winding spool, a uni-directional clutch coöperative with the spindle, a plate adapted to be fixed to the camera body, and means comprising pins attached to one of the clutch members and longitudinally movable through said plate for preventing rotation of said clutch member with respect to the plate.

5. In a camera, the combination of a winding key embodying a rotatable spindle movable axially to couple and uncouple relatively to a film-winding spool, a uni-directional clutch coöperative with the spindle and movable axially therewith, a plate adapted to be fixed to the camera body, and pins attached to the clutch and movable axially through said plate in parallelism with the axis of the spindle.

6. In a camera, the combination of a winding key embodying a spindle to coöperate with a film-winding spool, a clutch housing and clutch surrounding and coöperative with the spindle, a plate fitting around and guiding the clutch housing and adapted to be fixed to the camera body, and pins connected to the clutch housing and movable through said plate in parallelism with the axis of said spindle.

7. In a photographic camera, the combination of a winding key embodying a spindle to coöperate with a film-winding spool, a housing and clutch surrounding and coöperative with the spindle, a plate fitting around and guiding the housing and adapted to be fixed to the camera body, a relatively fixed bushing surrounding the spindle, a collar on the spindle coöperative with and guided by said bushing, and a spring surrounding the housing and interposed between said plate and collar to yieldingly retain the spindle in coupled relation to the spool.

8. In a photographic camera, the combination of a winding key to coöperate with a film-winding spool embodying a rotatable spindle movable axially to couple and uncouple relatively to said spool, a uni-directional clutch and clutch housing surrounding the spindle, said housing having a cylindrical portion and a flange, a plate fitting around the cylindrical portion of said housing and adapted to be fixed to the camera body, pins fixed to the flange of the housing and movable through said plate in parallelism with the axis of said spindle, a collar on said spindle, a spring surrounding said housing and interposed between said plate and collar, and a relatively fixed bushing surrounding said spring and collar and guiding the latter.

In testimony whereof I have hereunto set my hand in presence of two subscribing witnesses.

JOSEPH GODDARD.

Witnesses:
N. E. FISHELL,
J. H. DYER.